Nov. 13, 1951 A. LEMAY 2,575,022
LENS BEVELING MACHINE
Filed Feb. 21, 1949 7 Sheets-Sheet 1

INVENTOR.
ARTHUR LEMAY
BY *Mock & Blum*
ATTORNEYS

Nov. 13, 1951          A. LEMAY          2,575,022

LENS BEVELING MACHINE

Filed Feb. 21, 1949          7 Sheets-Sheet 2

INVENTOR.
ARTHUR LEMAY
BY Mock & Blum
ATTORNEYS

Nov. 13, 1951            A. LEMAY            2,575,022

LENS BEVELING MACHINE

Filed Feb. 21, 1949            7 Sheets-Sheet 3

INVENTOR.
ARTHUR LEMAY
BY Mock & Blum
ATTORNEYS

Nov. 13, 1951 A. LEMAY 2,575,022
LENS BEVELING MACHINE
Filed Feb. 21, 1949 7 Sheets-Sheet 4

INVENTOR.
ARTHUR LEMAY
BY Mock & Blum
ATTORNEYS

Nov. 13, 1951  A. LEMAY  2,575,022
LENS BEVELING MACHINE
Filed Feb. 21, 1949  7 Sheets-Sheet 5

INVENTOR
ARTHUR LEMAY
BY Mock & Blum
ATTORNEYS

Nov. 13, 1951  A. LEMAY  2,575,022
LENS BEVELING MACHINE
Filed Feb. 21, 1949  7 Sheets-Sheet 6

INVENTOR
ARTHUR LEMAY
BY Mock & Blum
ATTORNEYS

Nov. 13, 1951 A. LEMAY 2,575,022
LENS BEVELING MACHINE
Filed Feb. 21, 1949 7 Sheets-Sheet 7

INVENTOR
ARTHUR LEMAY
BY Mock & Blum
ATTORNEYS

Patented Nov. 13, 1951

2,575,022

UNITED STATES PATENT OFFICE 2,575,022

LENS BEVELING MACHINE

Arthur Lemay, Ozone Park, N.Y.

Application February 21, 1949, Serial No. 77,589

10 Claims. (Cl. 51—101)

This invention relates to a new and improved lens grinding machine. In particular, the machine is adapted to grind bevel-edged optical lenses, and avoids any necessity for finishing such lenses by hand.

When a thick optical lens is to be placed in an eye-glass frame, it is customary to bevel the surfaces of such a lens. When this is done, the outer portions of the respective surfaces of the lens slope toward each other, so that the peripheral edge of the lens is considerably thinner than the central portion thereof. The lens may then be readily fitted into the groove of a standard eye-glass frame.

It is desirable in such work that one surface of the lens be beveled to a greater extent than the other surface. Then the portion of the peripheral edge, which is to be gripped by the frame, is nearer to the main portion of the less-beveled surface than to the main portion of the other surface. The lens is set in the frame with the less-beveled surface facing the front, and protruding only slightly. The heavily beveled surface protrudes to the rear of the frame, where such protrusion is not readily noticed. The appearance of the eye-glasses is thereby enhanced.

When each surface of the lens is beveled equally, there is a ½–½ bevel ratio. When the bevel of one surface is greater than the bevel of the other surface, there is an unequal bevel ratio. A standard desired bevel ratio is ⅓–⅔, wherein the bevel of one surface is twice that of the other surface.

It is an object of the invention to provide a device which will grind the peripheral edge of a lens accurately to any desired bevel ratio, without the necessity for finishing the lens by hand.

Another object of this invention is to provide a device for beveling the peripheral edge of a lens, which may be easily and quickly adjusted so that any desired bevel ratio may be accurately produced, without the necessity for finishing the lens by hand.

Another object of this invention is to provide a machine with means for producing an easily and accurately varied bevel ratio on lenses, which means are simple and economical to construct.

Another object of this invention is to provide a machine for grinding optical lenses, in which the main housing, to which a housing holding the lens is attached, has limited freedom of rotational movement and easily and accurately adjustable means to exert a force of rotation on said main housing so as to cause said lens to bear more heavily against one side of a V-shaped groove in the rim of the grinding wheel than against the other side of said groove, thereby producing any desired unequal bevel ratio on the surfaces of said lens.

Another object of this invention is to provide a machine, such as described immediately preceding, in which universal coupling means are provided to couple the source of power to the gear system in said main housing.

Another object of this invention is to provide a grinding machine which will provide an adjustable, accurate bevel ratio on the peripheral edge of a lens, and which has means for automatically removing said lens from contact with the grinding wheel after a predetermined number of revolutions of the lens, thereby preventing either surface of said lens from being beveled to too great an extent.

Another object of this invention is to provide a grinding machine which will provide an adjustable accurate bevel ratio on the peripheral edge of a lens, and which is provided with means whereby said lens may be simultaneously and automatically removed from contact with the grinding wheel and caused to cease rotating, after a predetermined number of revolutions of the lens.

Other objects and advantages of the invention will become apparent in the following description and in the annexed drawings, in which a preferred embodiment is shown, and in which, Fig. 1 is a side view of the device, also showing the motor by means of which the grinding wheel is caused to revolve. The view is shown partly broken away and partly in section;

Figure 3:
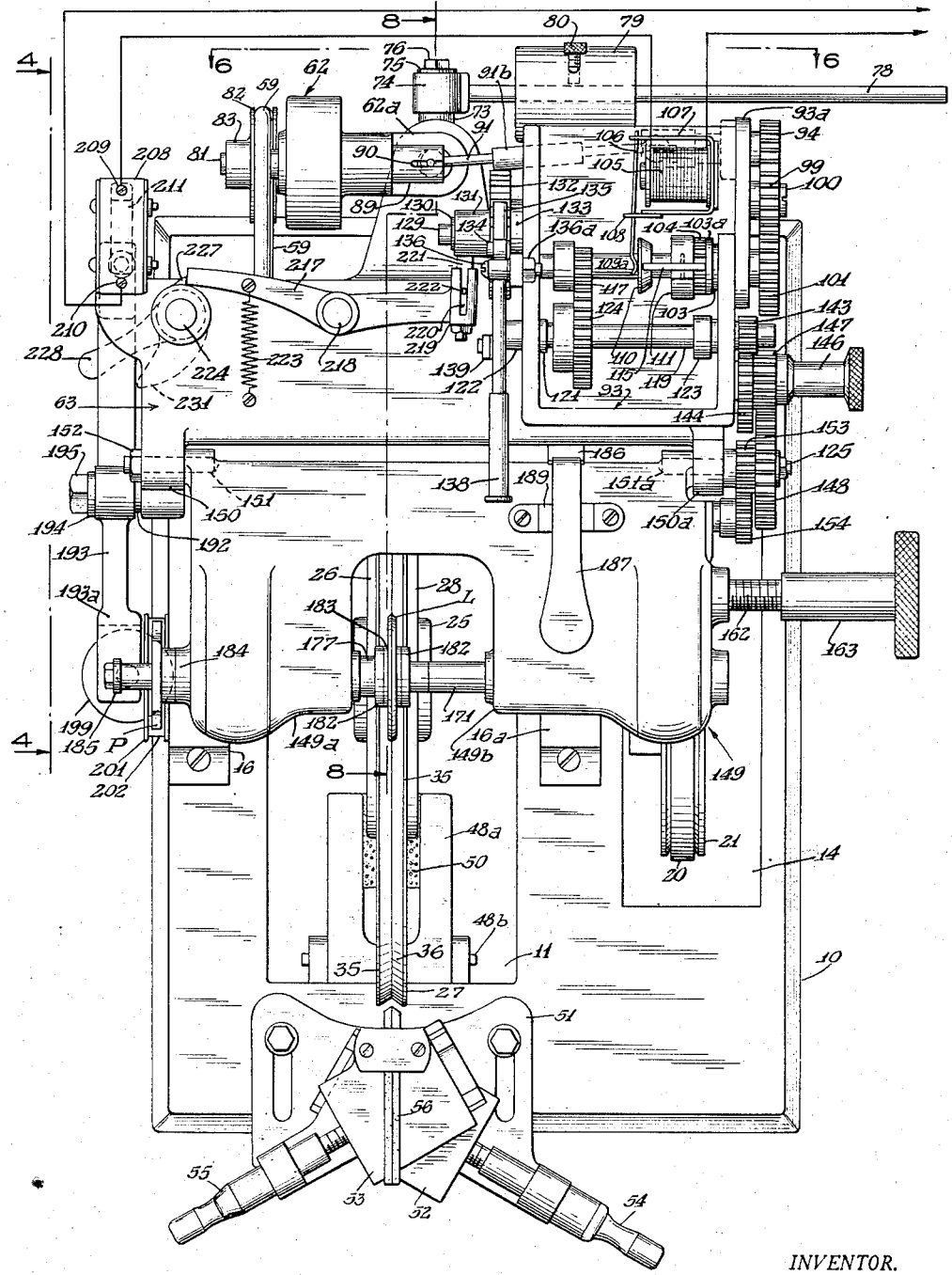
Fig. 3 is a top plan view of the device with the covers removed. In this view, the parts are shown in positions corresponding to the lens housing being in its down position with the lens in contact with the grinding wheel.
Figure 4:
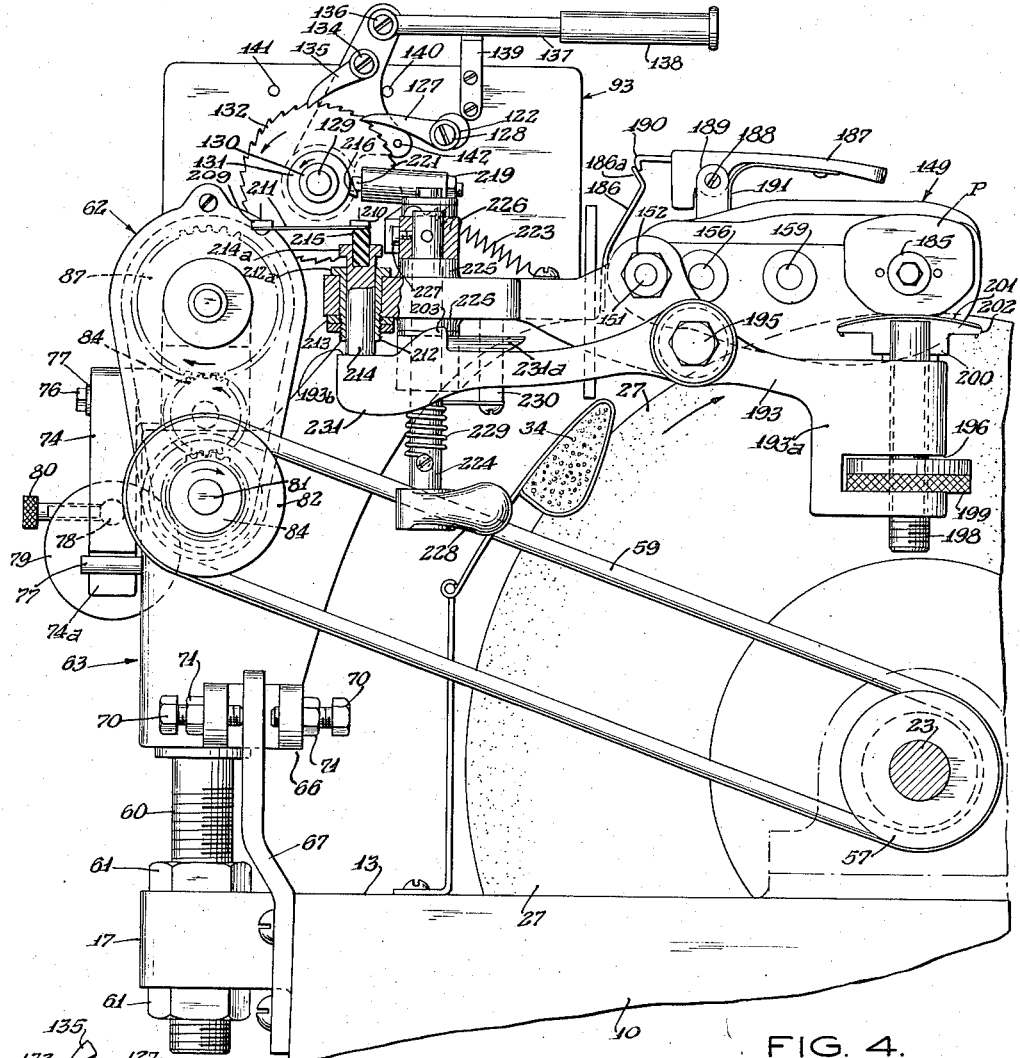
Figure 5:
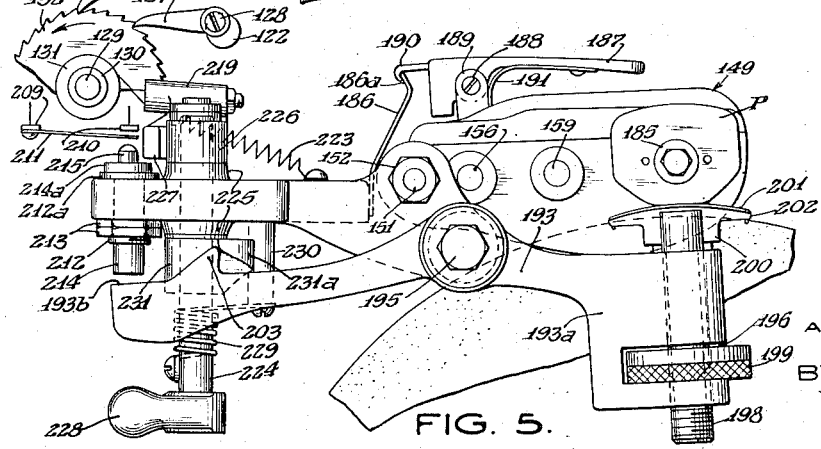
Figure 6:
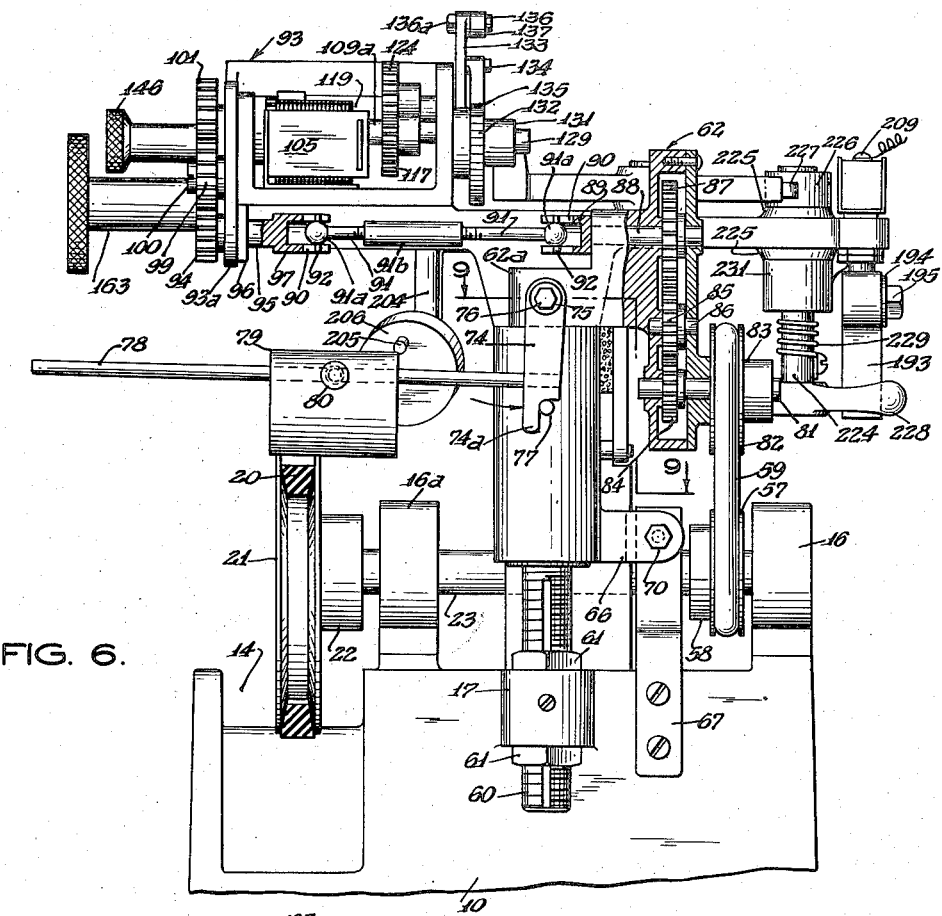
Figure 7:
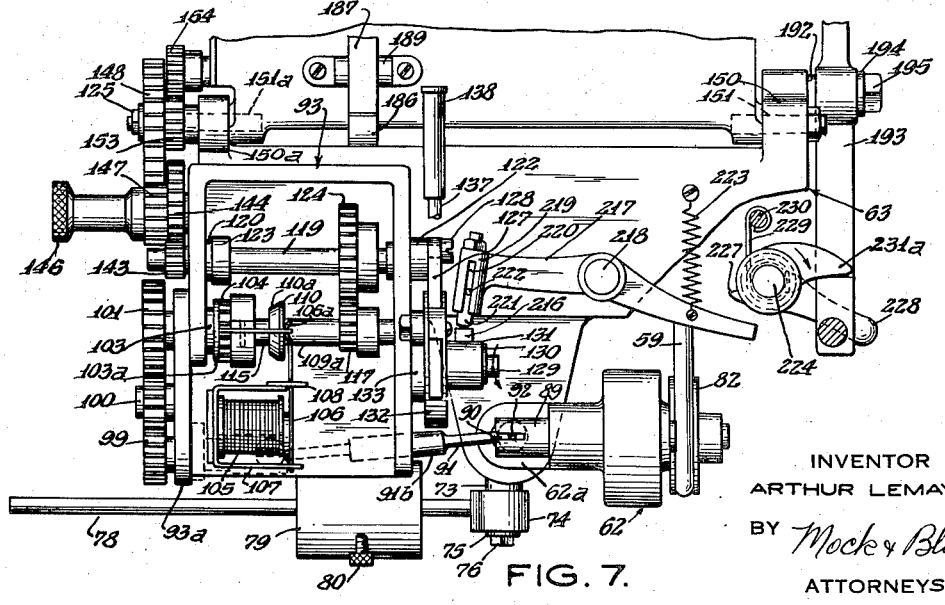

Fig. 4 is a side view, partially in section, along the line 4—4 of Fig. 3. The view is broken away, with part of the grinding wheel as well as the sharpening attachment being omitted. The lens housing is in its down position, in which position the lens may be ground;

Fig. 5 is a detail view similar to Fig. 4, showing the position of various parts when the lens housing is in raised position and the lens is no longer being ground;

Fig. 6 is a rear view along the line 6—6 of Fig. 3. The view is shown broken away at the bottom, with a portion of the casting on which the machine rests being omitted. The view is shown partly in section, to show the fixed gear housing and the universally mounted connecting rod connecting the gears of said fixed gear housing to the gears of the main housing;

Fig. 7 is a detail view similar to Fig. 3, corresponding to the lens housing being in raised position, but showing the clutch means just prior to being disengaged.

Figure 1:
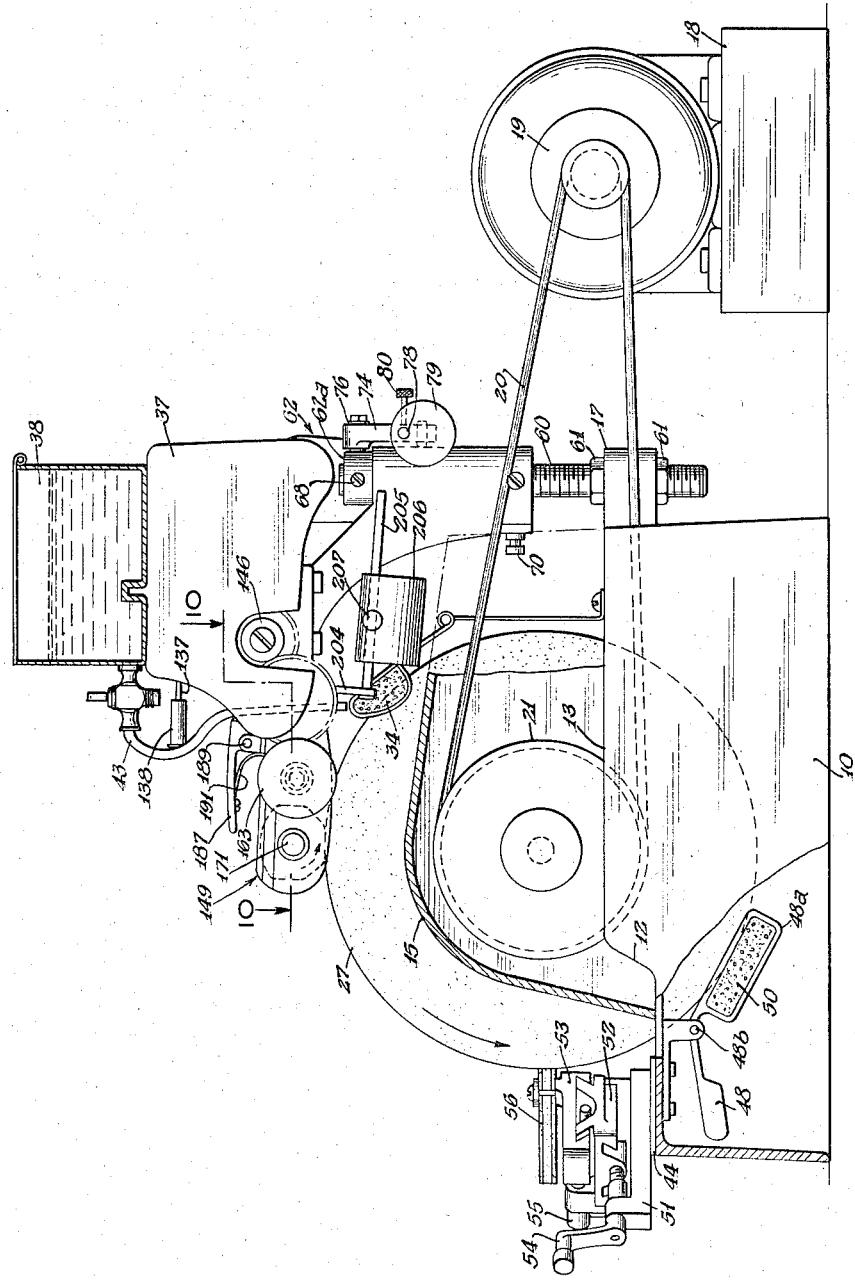
Figure 2:
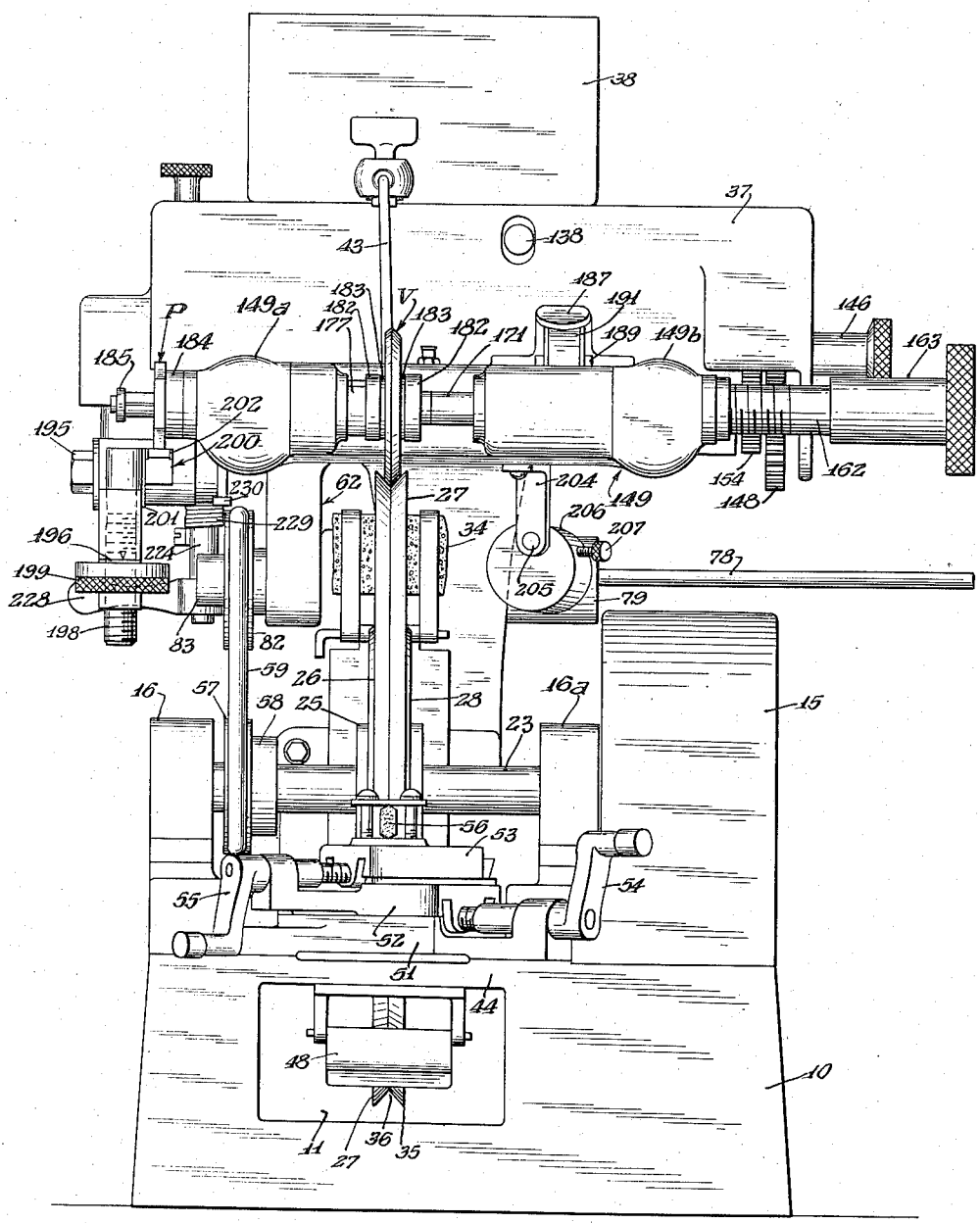
Fig. 2 is a front view of the device.
Figure 8:
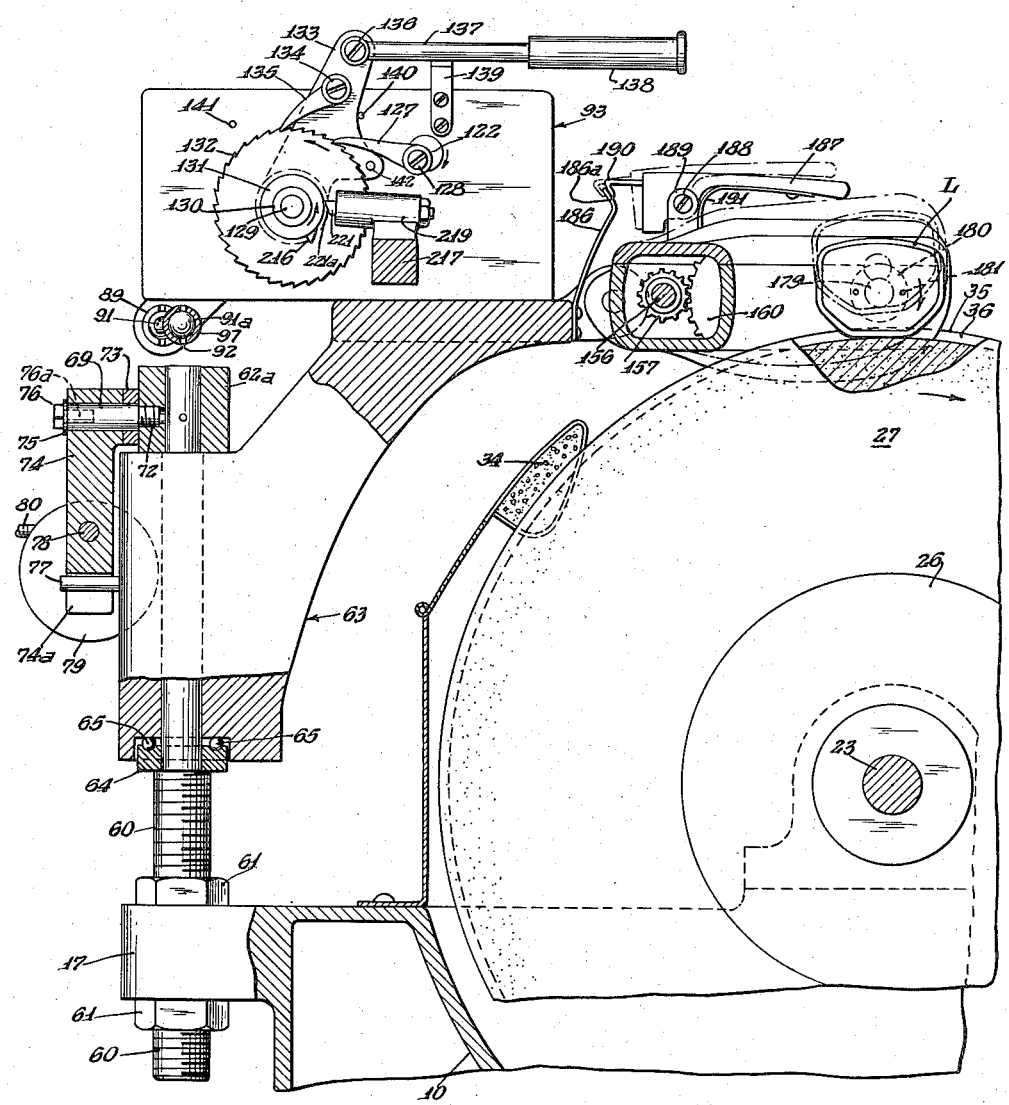
Figure 9:
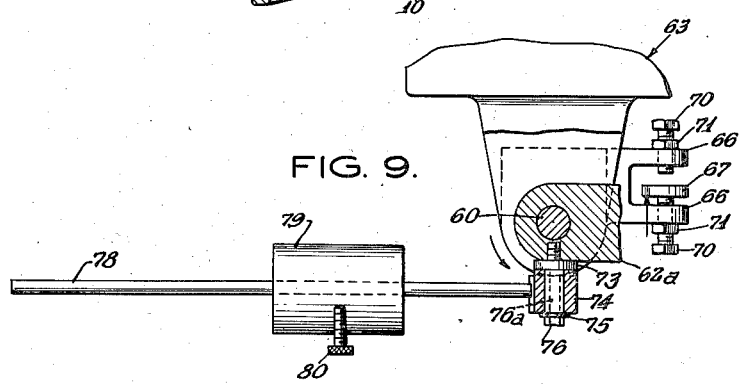
Figure 10:
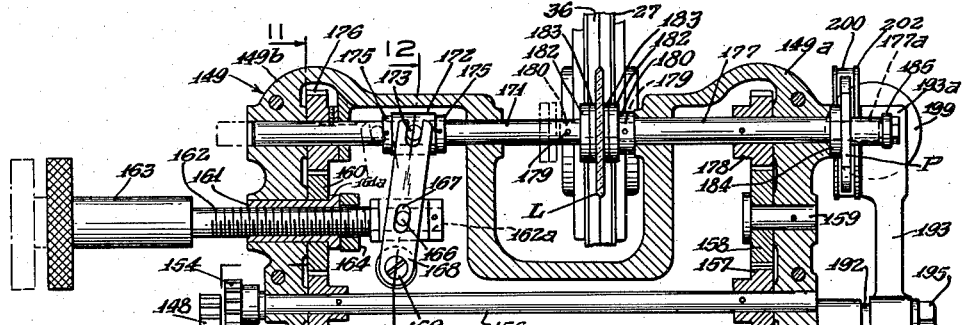
Figure 11:
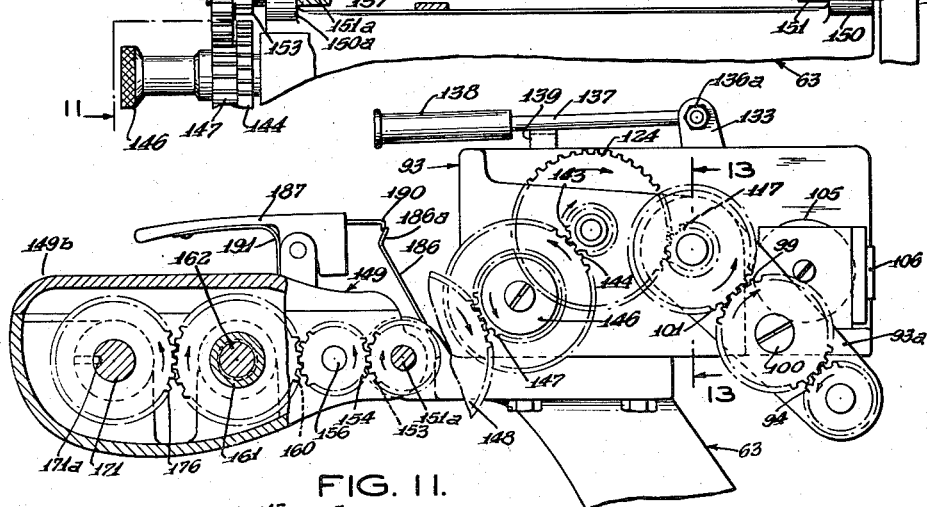
Figure 13:
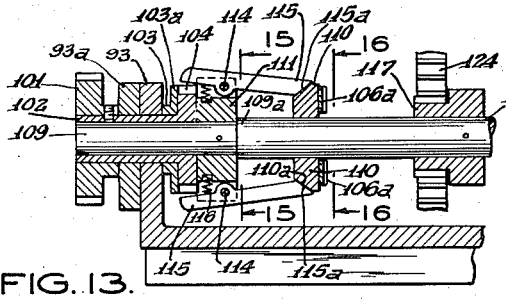
Figure 12:
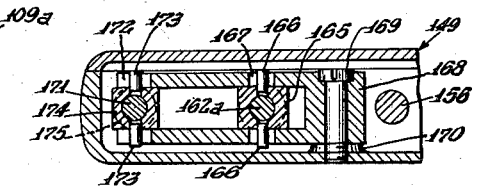
Figures 14, 15:
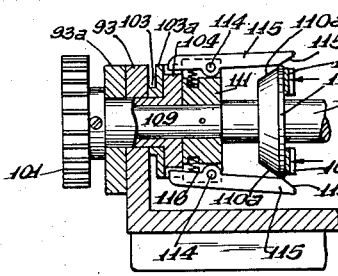

Fig. 8 is a section along the line 8—8 of Fig. 1. The view is shown broken away at the bottom and at the right side, omitting portions of the frame and of the grinding wheel and the sharpening attachment. The positions of certain of the parts corresponding to the lens housing's raised position are shown in dotted lines;

Fig. 9 is a section on line 9—9 of Fig. 6, showing a detail of the weight arm, and of the stops for limiting the movement of the main housing;

Fig. 10 is a section on line 10—10 of Fig. 1, showing a detail of the lens housing. The dotted line positions of certain parts show those parts in position for disengaging the lens from the holding jaws;

Fig. 11 is a section on line 11—11 of Fig. 10, showing the relationship of the gears in the lens housing to the gears in the main housing;

Fig. 12 is a section on the line 12—12 of Fig. 10, showing a detail of the mechanism for engaging and disengaging the lens;

Fig. 13 is a section on the line 13—13 of Fig. 11. The view shows a detail of the clutch which engages the gear train which turns the lens. The clutch is shown in disengaged position;

Fig. 14 is a detail view, similar to Fig. 13, but showing the clutch in engaged position. Certain of the parts are shown in elevation rather than in section;

Fig. 15 is a section along line 15—15 of Fig. 13; and

Figure 16:
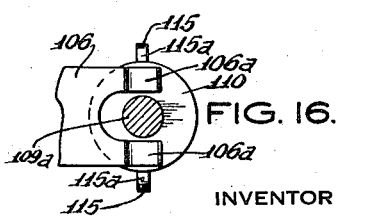

Fig. 16 is a section along the line 16—16 of Fig. 13.

Fig. 1 shows the improved machine as comprising a base 10, in which grinding wheel 27 is rotatably mounted. Vertical post 60 is fixed in said base 10, and main housing 63 is mounted on said post. As is shown in Fig. 3 and other figures, lens housing 149, on which lens L is rotatably mounted, is secured to main housing 63 with a limited freedom of vertical movement. Lens housing 149 may be placed in its lowered position, so that the peripheral edge of lens L rests within V-shaped groove or notch 36, which is formed in rim 35 of grinding wheel 27 and extends completely around the circumference of said wheel.

When lens L and grinding wheel 27 are caused to rotate, the portions of the respective surfaces of lens L bearing against the respective sloping sides of groove 36 become beveled. When the surfaces of lens L bear equally against the respective sides of groove 36, an equal, or ½-½ bevel ratio is produced. When one surface of lens L bears more heavily against the respective side of groove 36 than the other surface, an unequal bevel ratio is produced.

It is a feature of this invention that main housing 63 is mounted on post 60 with a limited freedom of rotation in a horizontal plane. As is shown in Fig. 6, a lever system is provided whereby the force in a downward direction of a weight 79 is translated into a force tending to cause main housing 63 to rotate. This rotational force is sensitive to the adjustment of weight 79 on a lever arm 78.

The rotational force on main housing 63 is a force which causes one surface of lens L to bear more heavily against the respective side of groove 36 than the other surface, thereby producing an unequal bevel ratio.

Because of the slight freedom of rotation of main housing 63, special coupling means are required to couple the source of power to the gear system in said housing 63. The coupling means used in the preferred embodiment are shown in Fig. 6 and will be hereinafter described. The gear system in main housing 63 is further coupled to the gear system in lens housing 149.

In a more detailed description of the above parts, it is seen that base 10, which is preferably a casting, is substantially a hollow framework. Frame 10 may be placed on any convenient support, such as a table. A depressed channel 11 is formed running from the front of frame 10 to a point near the rear of said frame. Grinding wheel 27 is disposed within said channel and is mounted on shaft 23. Said shaft is rotatably mounted in bearing housings 16 and 16a, and protrudes beyond housing 16a.

Drive wheel 21 is mounted on the end of shaft 23 which protrudes beyond bearing housing 16a. Said wheel is driven by means of a conventional motor 18, which may be placed posteriorly to frame 10. Continuous belt 20 connects drive wheel 21 to drive wheel 19 of motor 18.

Post 60 is mounted in an opening in projection 17, which projects outwardly from the rear wall of frame 10. The lower portion of post 60 is threaded, and it may be vertically adjusted by means of a pair of nuts 61, which are respectively mounted on said post above and below projection 17.

A gear housing 62 is provided, which has a recessed flange portion 62a, by means of which it is mounted on post 60 at the top thereof. Housing 62 is fixed to post 60 by means of screw 68.

The manner of mounting main housing 63 on post 60 below housing 62, is clearly shown in Fig. 8. Collar 64 is fixedly secured to post 60, and fits within a recess in the bottom of housing 63, to prevent vertical movement thereof on post 60. The top of collar 64 serves as a race in which ball bearings 65 are mounted to permit free rotation of housing 63.

The rotation of housing 63 is limited by means of bracket 66 and post 67, as is clearly shown in Figs. 4 and 9. This serves to prevent damage to the universal coupling means. Bracket 66 is secured to housing 63, and is U-shaped, the arms of said bracket being horizontal. The arms of bracket 66 pass on either side of the top vertical portion of post 67. Post 67 is secured to the rear wall of frame 10. As a further limitation on the rotation of housing 63, adjusting screws 70 may be passed through the respective arms of bracket 66, the position of said screws 70 being respectively controlled by adjusting nuts 71.

The manner of mounting weight 79 and its arm 78 is clearly shown in Figs. 6 and 9. A rod 69 is provided, with a threaded extension 72 which screws into a threaded recess in the rear of extension 62a of gear housing 62. Shaft extension 72 may be screwed into housing extension 62a until flange or collar 73 of rod 69 abuts said extension 62a. A casting 74 has a recess, whereby said casting fits rotatably over rod 69. A screw 76 has a threaded shank 76a which screws into a threaded bore in rod 69. A washer 75 is provided, by means of which screw 76 holds casting 74 in place.

Weight arm 78 is secured to casting 74 and extends laterally of said casting. Weight 79 fits slidably over said arm 78 and may be fixed in place at any point thereon by means of screw 80. When arm 78 is in the approximately horizontal position of Fig. 6, casting 74 thereby depending substantially vertically, a force is exerted on said casting, tending to rotate it about rod 69. This force increases as weight 79 is moved toward the free end of arm 78.

Pin 77 extends rearwardly from the back of main housing 63, and it is apparent that a force exterted on pin 77 in the direction of the arrow shown in Fig. 6 will cause housing 63 to tend to rotate about post 60. Casting 74 has a narrowed extension 74a which abuts one side of pin 77 when said casting is approximately vertical. The force exerted by weight 79 causes casting extension 74a to exert a force on pin 77 in the direction of the arrow shown in Fig. 6, and this force causes housing 63 to tend to rotate.

When weight 79 is adjusted outwardly on arm 78, and lens housing 149 rotated and lowered to place lens L within groove 36 of grinding wheel 27, the rotational force on main housing 63 and on lens housing 149, resulting from the action of said weight 79, causes one surface of said lens L to bear more heavily against the side of said groove 36 than the other surface. An unequal bevel ratio is thereby produced. If the turning force exerted on casting 74 is reduced substantially to zero, either by removing weight 79 from arm 78 or by placing weight 79 as far inwardly on arm 78 as it will go, then a ½–½ bevel ratio is produced.

As was heretofore stated, the slight freedom of rotation of main housing 63 makes it advisable that universal coupling means be employed, to couple the source of power to the gear system of said housing 63. As is clearly shown in Fig. 6, drive wheel 57 is mounted on driven shaft 23 adjacent to bearing housing 16. Said drive wheel 57 drives wheel 82 by means of continuous belt 59. Said wheel 82 drives the gear train mounted in gear housing 62.

Wheel 82 is mounted outside gear housing 62 on protruding shaft 81. Wheel 82 has a hub 83, also mounted on shaft 81. Shaft 81 extends into housing 62, with the side walls of said housing acting as bearings. Gear 84 is mounted on shaft 81 inside housing 62, and is driven by wheel 82. Said gear 84 in turn drives gear 85, which is mounted on shaft 86 intermediate the walls of housing 62. Said gear 85 in turn drives gear 87, which is held in the top of housing 62 by means of shaft 88.

One end of shaft 88 projects beyond the wall of housing 62 toward the center of the machine. A bushing 89 is integral with said end of shaft 88. Said bushing 89 has a cylindrical bore, the walls of which have a pair of opposed longitudinal slots 90. A rod 91 has a rounded end-portion 91a out of which two pins 92 project. Said pins 92 are respectively engaged by slots 90. Therefore, rod 91 is held by bushing 89 with freedom of longitudinal movement and a slight amount of angular play. The other end of rod 91 is threaded and screws into one end of a threaded bore in shaft 91b.

On the upper right side of main housing 63, is a gear box 93. Box 93 is preferably cast, and is open at the back and top. Box 93 serves as a housing, between the walls of which and outside the wall of which, gears may be mounted. A supplementary gear support member 93a is secured to the right wall of box 93 in the position shown in Fig. 11. Gear 94 is mounted at the free end of member 93a, by means of a shaft 95 which runs through member 93a, through a bearing 96, and under the bottom of box 93.

Shaft 95 is terminated by a bushing 97, which is precisely similar to bushing 89. A second rod 91 is secured in bushing 97, exactly as described for the first rod 91 in bushing 89. The free end of said rod 91 screws into the other end of shaft 91b. The universal coupling is thus completed, and motor 18 is coupled to gear 94 in main housing 63.

As is clearly shown in Figs. 3 and 7, gear 94 is the first in a train of gears 94, 99, 101, which are mounted on support member 93a. Said gear train is coupled to further gear trains mounted on gear box 93. Gear 101 is coupled by electromagnet-operated clutch means to gear train 117, 124. Gear 124 is coupled to a gear train 143, 144.

Gear 144 is coupled to a gear train 147, 148. Gears 144 and 147 are mounted with handle 146, on gear box 93, so as to be manually turnable by same, although said handle may be disengaged from gear 144 if desired.

Gear 148 is coupled to gear train 153, 154. Gear 154 is mounted outside lens housing 149 and is coupled to the gear system mounted inside said housing. The interrelationship between the gear system mounted on main housing 63 and the gear system of lens housing 149 is clearly shown in Fig. 11. Fig. 10 clearly shows the gears mounted in said lens housing.

In a more detailed description of the above parts, it will be noted that gear 99 is mounted on member 93a by means of screw 100. As is clearly shown in Figs. 13 and 14, gear 101 is mounted on sleeve 102, through which shaft 109 extends. Gear 117 is mounted on extension 109a of said shaft 109.

Sleeve 102 extends through member 93a and the outer side wall of box 93, and through bearing 103. Said sleeve 102 is integral with ratchet member 104, which abuts flange 103a of bearing 103.

Shaft 109 extends through ratchet 104 and through bushing 111. Then the diameter of said shaft increases slightly to form extension 109a, the other end of which is mounted in the inner side wall of gear box 93. Sleeve 110 is slidably mounted on shaft extension 109a, and may be moved to operate the clutch means causing said shaft together with gear 117 to rotate when gear 101 and sleeve 102 rotate.

Said clutch means comprise rods 115 which are respectively pivotally mounted, by means of pivot pins 114, in longitudinal recesses formed through bushing 111. As is clearly shown in Fig. 15, notches 112 are cut in the periphery of bushing 111 to provide access for the insertion of said pins 114. Springs 116 are respectively embedded in bushing 111 and attached to respective rods 115, and act to bias the ends of said rods 115 away from ratchet 104.

The other ends of rods 115, which are adjacent to sleeve 110, have sloped or inclined faces 115a which bear against the reciprocally tapered portion 110a of sleeve 110. Normally, sleeve 110 is in the position of Fig. 13, and pins 115 do not engage ratchet 104. However, a force is exerted on sleeve 110 to push it toward bushing 111, to the position of Fig. 14. Tapered sleeve portion 110a bears against end faces 115a of said pins 115 and pushes said end faces outwardly. The other ends of rods 115 are thereby pushed inwardly until their respective bottom edges 115b are engaged by ratchet 104. As a result, shaft 109 is coupled to sleeve 102, and gear 117 turns with gear 101. When said force on sleeve 110 is released, the action of springs 116 causes said sleeve to return to the position of Fig. 13, and the clutch is disengaged.

The movement of sleeve 110 is controlled by electromagnet 105, which is mounted in housing 107 in the rear portion of box 93. This is clearly shown in Figs. 3 and 7. One end of an armature 106 is hingedly secured to the rear wall of housing 107, and said armature passes through bracket 108 on the front wall of said housing. The free end portion of said armature 106 is forked or bifurcated into two arm extensions 106a, which pass respectively above and below shaft extension 109a and bear against sleeve 110. This is clearly shown in Fig. 16.

Normally, armature 106 is in the position of Fig. 3, corresponding to the position of sleeve 110 in Fig. 13. When the electrical circuit of electromagnet 105 is closed, in a manner which will be described below, armature 106 is moved to the position of Fig. 7, and arm extensions 106a push sleeve 110 to the position of Fig. 14, thereby engaging the clutch means. When the circuit of electromagnet 105 is opened, the parts return to the positions of Figs. 3 and 13, and the clutch means are disengaged.

Gear 124, which is driven by gear 117, is mounted on shaft 119. Shaft 119 is rotatably mounted in the side walls of box 93, and has an extension outside the inner side wall. Said extension of shaft 119 has a collar 122 mounted thereon. Said collar has an end face with a pawl 127 eccentrically and loosely mounted thereon by means of screw 128. The function of said pawl will be hereinafter described.

Shaft 119 also couples gear 124 to gear 143, which is mounted on an extension of said shaft external to the outer wall of gear box 93. Said gear 143 drives gear 144, which is coupled to gear 147 and which, along with said gear 147, is manually turnable by means of handle 146, in the manner heretofore described.

Gear 147 drives gear 148. Inner gear 153 is secured to said gear 148, and both are rotatably mounted on pivot rod 151a. Gear 153 drives the gears of lens housing 149.

Said lens housing 149 is pivotally secured to main housing 63, as is clearly shown in Figs. 3 and 10. Housing 63 has on either side thereof, forward projections 150 and 150a. Rods 151 and 151a are respectively fixed in said housing projections 150 and 150a, and extend inwardly of said projections. Said rods fit into recesses in lens housing 149, which rotates on said rods.

Viewed from the top, housing 149 is approximately U-shaped with forward projections 149a and 149b. Shaft 156 extends through the main portion of housing 149 and is rotatably mounted in the side walls thereof. Shaft 156 extends outside one of said walls of housing 149, and has mounted thereon gear 154, which meshes with gear 153 on rod 151a. This meshing takes place even when lens housing 149 is rotated on rods 151 and 151a.

A pair of gears 157 are mounted on shaft 156 adjacent the respective side walls of housing 149. One gear 157 drives gear 158, which is rotatably mounted on rod 159. Said rod is fixed in a side wall of housing 149. The other gear 157 drives gear 160, which is mounted on sleeve 161 adjacent the other side wall of said housing.

Gear 160 drives gear 176, which is secured to shaft 171. Gear 158 drives gear 178, which is secured to shaft 177. Shaft 171 is rotatably and slidably mounted in the side walls of housing extension 149b, and shaft 177 is rotatably mounted in the side walls of housing extension 149a. Shafts 171 and 177 revolve at the same speed, extend between housing extensions 149a and 149b, and are adapted to have lens L mounted intermediate each other. The other end of shaft 177 extends beyond the outer side wall of housing extension 149a, and is adapted to have pattern plate P mounted thereon.

Means are provided for moving shaft 171 to clamp and unclamp lens L, said means being clearly shown in Figs. 10 and 12.

Sleeve 161 is mounted in the wall of lens housing 149, extends inwardly through gear 160, and terminates in a portion 161a of increased diameter, which portion abuts gear 160. Sleeve 161 has an internal threaded bore through which passes threaded shaft 162. Shaft 162 has a handle 163, which may be manually turned to drive said shaft inwardly or outwardly. Nut 164 is screwed over said shaft 162 and abuts portion 161a of sleeve 161, serving as a holding nut to hold said sleeve in place.

A block 165 is loosely mounted over the unthreaded end portion 162a of shaft 162, axial movement of said block being prevented by suitable means, such as collars mounted on said shaft portion 162a. A similar block 174 fits loosely over shaft 171, the axial movement of said block being prevented by collars 175 on shaft 171.

A yoke member 168 has a pair of spaced parallel arms which respectively fit above and below respective shafts 162a and 171. The arms of said yoke member 168 respectively have slots 167 therein, adjacent to block 165, and slots 172 in the ends thereof, adjacent to block 174. Pins 166 project outwardly from block 165 and respectively protrude through respective slots 167. Further, pins 173 project outwardly from block 174 and respectively protrude through respective slots 172. The hub portion of yoke member 168 is turnably secured to the base of housing 149 by means of screw 169 and washer 170.

It is thus apparent that when handle 163 is screwed outwardly, shaft 171 is retracted to the dotted line position shown in Fig. 10. However, when handle 163 is screwed inwardly to the full-line position of Fig. 10, shaft 171 is moved to the full-line position of Fig. 10. In this way, lens L may be inserted or removed.

As shown in Fig. 11, shaft 171 is provided with a longitudinal slot 171a, in which a key projection of gear 176 fits, so that said shaft rotates in unison with said gear. Nevertheless, shaft 171 is slidable with respect to gear 176, which is prevented from sliding by any convenient means.

The electrical circuit of electromagnet 105 is opened and closed by the action of a lever 193, which is pivotally attached to main housing 63. Normally, said circuit is open. However, when lens L is ground down sufficiently, pattern P is lowered and strikes against the head 193a of lever 193. The other end of lever 193 is thereby raised and closes a movable contact completing the electrical circuit. This is apparent from Figs. 4 and 5.

There are two means by which the circuit of electromagnet 105 may be broken. The first means is by an unground portion of lens L coming into contact with grinding wheel 27, thereby causing pattern P to rise and allowing lever 93 to pivot away from the movable contact.

The other means to break the circuit is actuated by ratchet 132, which is moved by the previously mentioned pawl 127. Ratchet 132 controls a mechanical system, clearly shown in Figs. 3 and 7, 4 and 5, and 8. After a complete revolution of ratchet 132, cam 216, which is carried along with said ratchet, causes lever 217 to shift position. This releases spring tensioned post 224 which rotates sharply. Cam projection 231a rotates along with said post and depresses lever 193 to break the circuit of electromagnet 105.

It a more detailed description of the above parts, it is seen that lever 193 is pivotally mounted on fixed shaft 192, which projects out of extension 150 of main housing 63. As is shown in Figs. 4 and 5, head 193a of said lever 193 has an internal bore in which is mounted a partly threaded shaft 198. Turning knob 199 is mounted on the threaded portion of said shaft, within recess 196 in lever head 193a, and serves as a means for adjusting said shaft vertically.

Shaft 198 extends above head 193 and has block 200 secured by any convenient means to its top portion. Blade spring 202 is mounted on said block and is located underneath and in alinement with pattern plate P.

The portion of lever 193 carrying said blade spring 202 is lighter than the other half of said lever, and therefore normally abuts plate P. Plate P may be lowered, thereby raising the opposite end of lever 193. Said opposite end may also be lowered, pressing blade spring 202 against plate P to raise it and lens housing 149, thereby removing lens L from contact with grinding wheel 27.

Electric switch means are so placed as to be actuated by upper surface 193b of the end of the heavier portion of lever 193. Said means comprise a junction plate 208, shown in Fig. 3, which is secured, by any convenient means, to the rear of housing 53. Two terminals 209 and 210 are provided on plate 208, to which are respectively attached wires leading to the solenoid and to the electrical circuit thereof. Said circuit is conventional and is not shown.

Terminals 209 and 210 extend beneath plate 208 and are shown schematically in Figs. 4 and 5 in association with contact spring 211. Contact spring 211, comprising a metal strip, is fixedly secured at one end to terminal 209. The other end of strip 211 is normally open, but may be forced against terminal 210 to complete the electrical circuit of electromagnet 105.

A vertical sleeve 212 is fixedly mounted by means of nuts 213, in a recess in a projection extending rearwardly of housing 63, below plate 208. Sleeve 212 has a head 212a above housing 63, and also projects below the recess in said housing. Within the bore of sleeve 212 is a piston 214, which is normally spring-biased to the down position of Fig. 5 by conventional internal spring means (not shown). Piston 214 has a head 214a, in which is embedded a knob 215, which is made of an insulating material. When head 193a of lever 193 is depressed, lever surface 193b bears against piston 214, and knob 215 is raised to strike against spring 211 and complete the electrical circuit of electromagnet 105.

When lever surface 193b is depressed, said electrical circuit is opened. The action of ratchet 132 to depress said surface is as follows.

Ratchet 132 is rotatably mounted on fixed shaft 129, which extends laterally from the inner side wall of gear box 93. Said ratchet is in position to be turned by pawl 127, which, as described above, turns when lens L turns. Ratchet 132 is rotated one revolution for approximately four revolutions of lens L.

Manual means for moving ratchet 132 are also provided. A relatively long, narrow plate 133 is rotatably mounted on shaft 129 adjacent box 93. Pawl 135 is mounted on said plate in position to engage ratchet 132 and prevent backward slip thereof. In addition, said pawl may be impelled against ratchet 132 to turn same by moving plate 133. Plunger 137, with screw-on handle 138, is loosely mounted at the top of plate 133 and may be pushed inwardly to move same. Plunger 137 is held in a substantially horizontal position by means of support means 139, which is fixed to gear box 93.

Stop pins 140 and 141 are secured in the side wall of box 93 respectively in front of and behind plate 133, to limit the movement of said plate. A further stop pin 142 is mounted in plate 133, in such a position, that when plate 133 is pushed forward into abutment with stop pin 141, stop pin 142 abuts against and limits the movement of pawl 127 so that it will not engage ratchet 132.

Ratchet 132 has secured thereto a hub 131, which carries a cam 216. After a revolution of said ratchet, said cam causes lever 217 to move.

Lever 217 is pivotally mounted by mounting means 218 on the top of main housing 63. One end of said lever 217 carries a head 219, which is hollow-cylindrical in shape and open at one end. Said head 219 has a longitudinal slot 220. Piston 221 rides inside head 219 and projects out of the opening thereof. Piston 221 has a pin 222 projecting therefrom, which rides in slot 220 and prevents rotation of said piston. Piston 221 is biased toward the open end of head 219 by means of a spring (not shown) located in the recess of head 219. When the sloped surface of cam 216 strikes the reciprocally sloped surface 221a of the free end of piston 221, piston 221 is gradually pushed back, against the action of the spring, and lever 217 is rotated slightly.

A tension spring 223 is secured to housing 63 and to lever 217, and biases said lever to resist the rotation imparted thereto by piston 221.

Adjacent the end of lever 217 which has no head mounted thereon, a post 224 is mounted vertically through a recess in main housing 63, said post being rotatably mounted in two bearings 225 located respectively above and below housing 63.

A collar 226 is fixedly secured at the top of post 224. A cam 227 projects from the side of collar 226. When post 224 is turned to the proper position, the flat face of cam 227 rests flush against the flat vertical edge of the end of lever 217.

A turnable handle 228 is mounted on the end of post 224 below housing 63. A coil spring 229 is wound around post 224 above handle 228. One end of spring 229 is secured to post 224, and the other end of spring 229 is secured to post 230, which depends downwardly from housing 63.

Spring 229 urges post 224 in a clockwise direction, as shown in Fig. 3, so that cam 227 normally fits tightly against lever 217.

A collar 231 is fitted over post 224 above spring

229. Said collar 231 has a cam-like projection 231a. Cam 231a has an outwardly sloped leading edge, the head of which normally is located slightly above the top surface of lever 193.

When cam 216 strikes piston 221 to rotate lever 217, the edge of said lever is moved out of abutment with cam 227, and the action of spring 229 causes post 224 to rotate sharply clockwise, as viewed in Fig. 3. The leading edge of cam 231a climbs over the top surface of the heavy portion of said lever 193, depressing said portion. This breaks the electrical circuit of electromagnet 105, and causes head 193a of the other portion of lever 193 to rise. Post 224 turns until cam 231a strikes stop 203 which is integral with lever 217.

The raising of lever head 193a causes spring 202 to strike against pattern plate P, thus raising pattern plate P, together with lens housing 149 and lens L. Lens L is therefore simultaneously raised from grinding wheel 27 and caused to stop rotating. At the same time, the action of weight 79 causes housings 63 and 149 to swing slightly to one side, until checked by stop-screw 70 in bracket 66.

In order to resume operations, as with a new lens inserted, plunger handle 138 is pushed inwardly to carry cam 216 past piston edge 221a, thereby permitting lever 217 to return to its normal position. Handle 228 is turned back in a counterclockwise direction as viewed in Fig. 3, until cam 227 is turned sufficiently to permit lever 217 to return to its normal position.

The operation of the machine is as follows.

Unground lens blank L is mounted in place, and weight 79 is adjusted. When the grinding is started, pattern P does not bear down sufficiently on lever head 193a for lever surface 193b to close the circuit of electromagnet 105. Therefore, lens L and ratchet 132 do not turn.

A brief period of grinding wears down lens L and plate P is lowered. Lever 193 is thereby actuated to close the circuit of electromagnet 105, and lens L and ratchet 132 are caused to turn until another unground portion of lens L is in contact with grinding wheel 27. The electrical circuit is opened, and lens L no longer turns.

The above process is repeated, and lens L alternately is motionless while being ground, and then rotates until a new unground portion is in contact with wheel 27.

After lens L completes approximately one revolution, it is usually sufficiently ground so that pattern P continually actuates lever 193 to close the electrical circuit of electromagnet 105. In that case, lens L rotates continuously. The finishing touches are thereby given to the bevel on said lens.

Too much grinding would be undesirable, as lens L would be worn down too much. This is avoided, because after approximately four revolutions of lens L, cam 216, which is carried by ratchet 132, actuates the mechanism causing cam 231a to depress lever 193. Lever head 193a is forced against pattern plate P, and lens L is lifted from wheel 27 and stops rotating.

Operation of the machine may be resumed by following the procedure described above.

Other conventional features of the machine include manual latch means to lock lens housing 149 in a raised position. Latching rod 186 is attached to main housing 63, and may be engaged by latch extension 190 on handle 186, which is pivotally mounted on housing 149.

Lens housing 149 is counterweighted by adjustable weight 206, so that the pressure holding lens L in contact with wheel 27 may be varied.

Water container 38 may be removably mounted above top cover 37, which is insertable over main housing 63. Water from said container may be allowed to drip through tubing 43 on to sponge 34, which impinges against wheel 27. An additional wiping sponge 50 is held against wheel 27 by counterweight 48.

Sharpening means for wheel 27 are mounted on support 44, which bridges channel 11. Said means comprise a base 51 and plates 42 and 53, which may be respectively adjusted by twining handles 54 and 55 to bring sharpener member 56 properly to bear against wheel 27.

While a preferred embodiment of this invention has been described, it is apparent that various changes and modifications may be made, without departing from the spirit and scope of the invention.

Other coupling means between the source of power and the gear system in main housing 63 may be provided. The important thing is to preserve some flexibility in the coupling, to allow for a slight freedom of rotation of housing 63.

Other means for mounting housing 63, besides post 60, may be provided. The chief concern is to preserve the lever features of the invention. Housings 63 and 149 are rotatable with respect to grinding wheel 27, in a horizontal plane. Lever means are rotatable in a vertical plane, the force of rotation exerted on said lever means being variable by adjusting a weight. Said lever means are adapted to engage housing 63 and exert a force of rotation on same. The precise means for mounting the above basic components may be varied.

Equivalent means may be provided for clamping and unclamping lens L. Modifications may be made in the construction of various parts, and in the coupling of the various gears and other movable parts.

Other changes and modifications may be made.

What is claimed is:

1. In a lens beveling machine of the character described, a frame, a grooved grinding wheel rotatably journalled within said frame and adapted to be coupled to a source of power, a post mounted vertically in said frame, a main housing rotatably mounted on said vertical post, a lens housing secured to said main housing and pivotable vertically relative to same, said lens housing being adapted to have a lens rotatably mounted thereon, said main housing and said lens housing being adapted to be positioned to set said lens in the groove in said grinding wheel, lever means secured to said vertical post and carrying a depending lever member, said lever member being rotatable in a vertical plane and being adapted to engage said main housing to exert a force of rotation on same, a weight arm secured to said lever member and extending laterally therefrom, a weight mounted on said weight arm and adjustable thereon to vary the force of rotation exerted by said lever member on said main housing.

2. A machine in accordance with claim 1, said source of power being coupled to a first gear system mounted in said main housing, said first gear system of said main housing being coupled to a second gear system in said main housing by electromagnet-controlled clutch means, said second gear system in said main housing being coupled to a gear system in said lens housing, said lens housing gear system being coupled to a shaft, said lens being adapted to be removably mounted on said shaft, whereby to cause said lens to revolve when the circuit of said electromagnet is closed to operate said clutch.

3. In a machine of the character described for beveling a lens by means of a rotating grinding wheel having a grooved rim, support means for said machine, a main housing mounted on said support means and rotatable in a plane transverse to said grinding wheel, weight-controlled lever means mounted on said support means and rotatable in a vertical plane, said lever means being adapted to engage said main housing and exert a force of rotation on same, a first gear system mounted in said main housing and universally coupled to a source of power, said first gear system in said main housing being coupled by electromagnet-operated clutch means to a second gear system mounted in said main housing, said second gear system being coupled to a pawl which causes a cam-carrying ratchet wheel to rotate, a lens housing secured to said main housing and pivotable vertically relative to same, said second gear system of said main housing being coupled to a gear system mounted in said lens housing, said lens housing gear system being coupled to an axially slidable shaft and an axially fixed shaft, said shafts being alined and simultaneously rotatable, means for adjusting said slidable shaft so as to clamp a lens blank intermediate the same and said axially fixed shaft, said lens blank being positioned in said groove of said grinding wheel, said axially fixed shaft having a pattern plate mounted on the other end thereof, said pattern plate being thereby raised or lowered depending on the extent to which any portion of said lens blank is ground, a lever pivotally mounted on said main housing and adapted to close a switch in the electrical circuit of said electromagnet to cause said lens and said cam-carrying ratchet to rotate, the action of said lever being controlled by the raising and lowering of said pattern plate, means actuated by said cam-carrying ratchet to move said lever to open said electrical circuit and exert an upward force on said pattern plate, thereby causing said lens to be removed from contact with said grinding wheel and to stop the rotation of said lens.

4. A machine in accordance with claim 3, said lever-moving means actuated by said cam-carrying ratchet, comprising a vertical post extending through a recess in said main housing and mounted rotatably therethrough, said post having top and bottom collars mounted thereon respectively above and below said main housing, each of said collars carrying a cam, said post being spring biased to rotate, a lever pivotally mounted on said housing, one end of said lever being spring biased to engage said cam on said top collar and prevent rotation of said post, the other end of said lever being adapted to be moved by said cam carried by said ratchet whereby to release said cam on said top collar and permit rotation of said post, said cam carried by said top collar having a sloped leading edge adapted to ride over said circuit-closing lever and depress same.

5. In a machine for grinding a lens by means of a grinding wheel, an assembly in which said lens is mounted, drive means for causing said lens to rotate, means for lifting said lens from contact with said grinding wheel after a predetermined number of revolutions of said lens, said lifting means comprising a ratchet, a pawl adapted to be engaged with and drive said ratchet, said pawl being eccentrically mounted on a shaft driven by said drive means, said ratchet carrying a cam, a vertical post extending through a recess in said assembly and mounted rotatably therethrough, said post having top and bottom collars mounted rotatably thereon respectively above and below said assembly, each of said collars carrying a cam, said post being spring biased to rotate, a lever pivotally mounted on said assembly, one end of said lever being spring biased to engage said cam on said top collar and prevent rotation of said post, the other end of said lever being adapted to be moved by said cam carried by said ratchet whereby to release said cam on said top collar and permit rotation of said post, said cam carried by said bottom collar having a sloped leading edge, a side lever centrally pivoted to the side of said assembly, one end of said side lever being adapted to be depressed by said sloped leading edge of said bottom collar of said post when same is rotated, whereby the other end of said side lever is elevated to actuate means to raise said lens.

6. In a lens grinding machine, the combination of a frame which has horizontal longitudinal and transverse axes, a grooved grinding wheel mounted on said frame with the axis of said wheel extending horizontally and transversely, said wheel being turnable about the axis thereof, a post mounted vertically in said frame, a main housing mounted on said post and turnable about the axis of said post, a lens housing pivotally secured to said main housing so as to be turnable about a horizontal axis, said lens housing being adapted to have mounted thereon a lens which is turnable about a horizontal axis, said main housing and said lens housing being adapted to be turned so as to position said lens in grinding position within said groove in said grinding wheel, a lever arm having one end mounted on said post so as to be turnable in a vertical plane about a horizontal axis, a weight arm connected to said lever arm and extending laterally thereof, a weight mounted on said weight arm, and a coupling member mounted on said main housing in the path of travel of said lever arm, whereby the action of said weight causes said lever arm to exert a turning force on said housing.

7. A claim in accordance with claim 6 in which the position of said weight on said weight arm is axially adjustable.

8. In a lens grinding machine, the combination of a support, a grinding wheel which has a grooved rim and which is mounted on said support so as to be turnable about a horizontal axis, a housing which is mounted on said support so as to be turnable about a vertical axis, said housing having means adapted to receive a lens which is turnable about a horizontal axis, means for locating said lens in grinding position within said groove in said grinding wheels, a lever arm having one end mounted on said support so that said arm is turnable in a vertical plane about a horizontal axis, a weight arm connected to said lever arm and extending laterally thereof, a weight mounted on said weight arm, and a coupling member mounted on said housing in the path of travel of said lever arm, whereby the action of said weight causes said lever arm to exert a turning force on said housing.

9. A claim in accordance with claim 8, in which the position of said weight on said weight arm is axially adjustable.

10. A lens grinding machine comprising a support, a grinding wheel which is mounted on said support so as to be turnable about a horizontal axis, a main housing mounted on said support, a lens housing pivotally secured to said main housing so as to be turnable about a horizontal axis, and adapted to receive a lens which is turnable about a horizontal axis, said lens housing being pivotable to place the rim of said lens in grinding relationship with the rim of said grinding wheels, drive means for turning said lens and said grinding wheels and means for removing said lens from contact with said grinding wheel after a predetermined number of revolutions of said lens, said removing means comprising a first lever arm which is mounted at an intermediate point thereof on said main housing so as to be turnable about a vertical axis, the first end of said first lever being connected to said main housing by a spring which tends to turn said lever, a ratchet wheel which carries a cam means and which is turnably mounted in said main housing and which is connected to and driven by said driving means, said cam means bearing against the other end of said first lever and counteracting the action of said springs, a vertical post turnably mounted in said main housing, a spring connected between said post and said main housing and tending to turn said post, said post having a side projection which normally abuts the end wall of said first end of said first lever to prevent said post from turning, a second lever arm mounted at an intermediate point thereof on said main housing so as to be turnable about a horizontal axis, said post having side projecting cam means which are positioned to block the path of travel of a first end of said second lever, the other end of said second lever being coupled to said lens housing, said ratchet wheel cam means having an angular position in which it moves said first lever against the action of said first lever spring so that said end wall of said first end of said first lever clears the path of travel of said post projection and permits said post to turn, said post cam means being operatively shaped thereby to turn said first end of said second lever, whereby the other end thereof turns said lens housing and removes said lens from contact with said grinding wheel.

ARTHUR LEMAY.

REFERENCES CITED

The following references are of record in the file of this patent:

UNITED STATES PATENTS

| Number | Name | Date |
| --- | --- | --- |
| 375,332 | Besson et al. | Dec. 27, 1887 |
| 1,272,474 | Long | July 16, 1918 |
| 1,630,264 | Gunning | May 31, 1927 |
| 1,657,720 | Long | Jan. 31, 1928 |
| 1,659,964 | Schultz | Feb. 21, 1928 |
| 1,865,642 | Raule | July 5, 1932 |
| 2,233,312 | Harrold | Feb. 25, 1941 |